(12) United States Patent
Douglas et al.

(10) Patent No.: US 12,422,662 B2
(45) Date of Patent: Sep. 23, 2025

(54) VERSATILE SPACE TELESCOPE

(71) Applicant: ARIZONA BOARD OF REGENTS ON BEHALF OF THE UNIVERSITY OF ARIZONA, Tucson, AZ (US)

(72) Inventors: Ewan Douglas, Tucson, AZ (US); Dae Wook Kim, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 138 days.

(21) Appl. No.: 17/879,374

(22) Filed: Aug. 2, 2022

(65) Prior Publication Data

US 2023/0194849 A1    Jun. 22, 2023

Related U.S. Application Data

(60) Provisional application No. 63/228,284, filed on Aug. 2, 2021.

(51) Int. Cl.
*G02B 23/06* (2006.01)
*G02B 7/02* (2021.01)
*G02B 7/183* (2021.01)

(52) U.S. Cl.
CPC ............. *G02B 23/06* (2013.01); *G02B 7/022* (2013.01); *G02B 7/183* (2013.01)

(58) Field of Classification Search
CPC ................................. G02B 23/06; G02B 7/183
See application file for complete search history.

(56) References Cited

U.S. PATENT DOCUMENTS

| | | | | |
|---|---|---|---|---|
| 4,562,583 A * | 12/1985 | Hoover | ................... | G21K 1/06 378/85 |
| 6,219,185 B1 * | 4/2001 | Hyde | ................... | B64G 1/286 359/566 |
| 6,226,121 B1 * | 5/2001 | Atkinson | ................ | G02B 26/06 343/915 |
| 6,699,341 B2 * | 3/2004 | Conzone | ................ | C03C 27/044 156/325 |
| 8,772,690 B2 * | 7/2014 | Smith | ................... | G01C 21/24 701/13 |
| 9,823,459 B2 * | 11/2017 | Bullard | ................... | G02B 7/183 |
| 9,921,099 B1 * | 3/2018 | Davila | ................... | B64G 1/105 |
| 10,241,293 B2 * | 3/2019 | Reid | ................... | B64G 1/2228 |
| 11,579,430 B2 * | 2/2023 | Choi | ................... | G02B 17/0631 |
| 11,668,915 B2 * | 6/2023 | Choi | ................... | G02B 23/06 359/366 |

(Continued)

FOREIGN PATENT DOCUMENTS

| | | | |
|---|---|---|---|
| CN | 102628978 A | * | 8/2012 |
| CN | 116841102 A | * | 10/2023 |
| CN | 117836691 A | * | 11/2023 |

(Continued)

*Primary Examiner* — Christopher Stanford
(74) *Attorney, Agent, or Firm* — Bond, Shoeneck & King, PLLC; George R. McGuire (57) ABSTRACT

A versatile space telescope for quantum key distribution and adapted for interfacing with a spacecraft and an instrument module. The telescope includes diamond turned aluminum mirrors at its entrance and exit, adjacent the spacecraft and instrument module, respectively.

6 Claims, 8 Drawing Sheets

(56) References Cited

U.S. PATENT DOCUMENTS 11,971,300 B1 * 4/2024 Aslam .................... B64G 1/10

FOREIGN PATENT DOCUMENTS

| CN | 117631416 A | * | 3/2024 | |
|---|---|---|---|---|
| FR | 2886724 A1 | * | 12/2006 | .............. F42B 15/01 |
| FR | 2905804 A1 | * | 3/2008 | ........... B64G 1/1021 |
| JP | 2000121950 A | * | 4/2000 | |
| JP | 2006276429 A | * | 10/2006 | |

* cited by examiner

One model provides:

Survivability Margins: (1) Structural analysis for baseline sizing against MAC loading and Modal requirements, (2) check of survivability for thermal stress and strains Performance Margins: (1) Provides machining tolerances required, figure errors introduced by non-perfect surface interfaces distorts M1, (2) Provides and checks allowable thermal gradients for optical performance over expected temp operating range This is an iterative process, e.g., when flexure meets structural requirements, its influence on M1 figure is checked due to thermal perturbations and due to surface interfaces. M1 is sensitive to moments and forces transferred thru flexures and metering tube OTA FEA Model

VERSATILE SPACE TELESCOPE

CROSS-REFERENCE TO RELATED APPLICATION

The present application relates and claims priority to U.S. Provisional Application Ser. No. 63/228,284, filed Aug. 2, 2021, the entirety of which is hereby incorporated by reference.

GOVERNMENT FUNDING

N/A

FIELD OF THE INVENTION

The present disclosure is directed to a versatile space telescope for Cubesats or SmallSats.

BACKGROUND

Space telescopes have traditionally been expensive to build, launch, and operate. To lower the cost for space exploration, smaller spacecraft referred to as CubeSats have been developed, primarily by university research teams. CubeSats provide a capable and reliable platform with focused functionality that permits lower cost and more rapid development of tools needed to explore and observe space.

One component of the CubeSats is the telescope that interfaces with the spacecraft and an instrument module. The telescope will receive, optically process and transmit data. The size of the CubeSat has been a limiting factor in the functionality of the telescope. Increasing the size of the CubeSat (e.g., 6 u to 12 u) will enhance the optical performance of the telescope but at a higher cost.

Material composition of the tool is also a limiting factor. The material must suitably degrade upon reentry into the atmosphere to prevent dangerous debris from scattering. The material must also be adaptive to the thermal stress imparted through the space travel. Further, the material composition must also limit vibrations that could adversely impact the telescope's performance.

Accordingly, there is a need in the art for a telescope capable of quantum communication or high-speed conventional laser communications and having applications in astronomy and Earth remote sensing.

SUMMARY

The present disclosure is directed to a versatile space telescope for Cubesats or Small Sats.

According to an aspect is a versatile space telescope for quantum key distribution and adapted for interfacing with a spacecraft and an instrument module, comprising an aluminum barrel shaped body having a longitudinal optical axis and a proximal end adapted for positioning adjacent the spacecraft and a distal end adapted for positioning adjacent the instrument module; a first diamond turned, aspheric aluminum mirror having an entrance pupil and positioned adjacent the distal end of the barrel shaped body and sharing the longitudinal optical axis; a second diamond turned, aspheric aluminum mirror creating an exit pupil and positioned adjacent the proximal end of the barrel shaped body and sharing the longitudinal optical axis; at least one heater integrated with the barrel shaped body to provide thermal control; a hex plate attached to the barrel shaped body, positioned in longitudinally spaced relation distally from the first mirror and sharing the longitudinal optical axis; a plano-convex aspheric lens supported by the hex plate and positioned along the longitudinal optical axis; and a plurality of flexures interconnecting the hex plate to the first mirror.

According to an embodiment, the hex plate comprises a plurality of apertures formed therethrough and that provide a means for interconnecting the instrument module to the telescope.

According to an embodiment, the prescription for the second mirror is convex hyperbola.

According to an embodiment, the prescription for the first mirror is concave ellipse.

According to an embodiment, the space telescope further comprises a lens support member secured to the hex plate and extending along the longitudinal optical axis.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes a versatile space telescope 10 for quantum key distribution. Telescope 10 is adapted to attach at its proximal end to a spacecraft 100, such as a CubeSat, and at its distal end to an instrument module 200. The specific details of the spacecraft 100 and instrument module 200 are conventional. An example of the details of spacecraft 100 may be found in U.S. Pat. No. 9,813,151, incorporated herein by reference.

Figure 1:
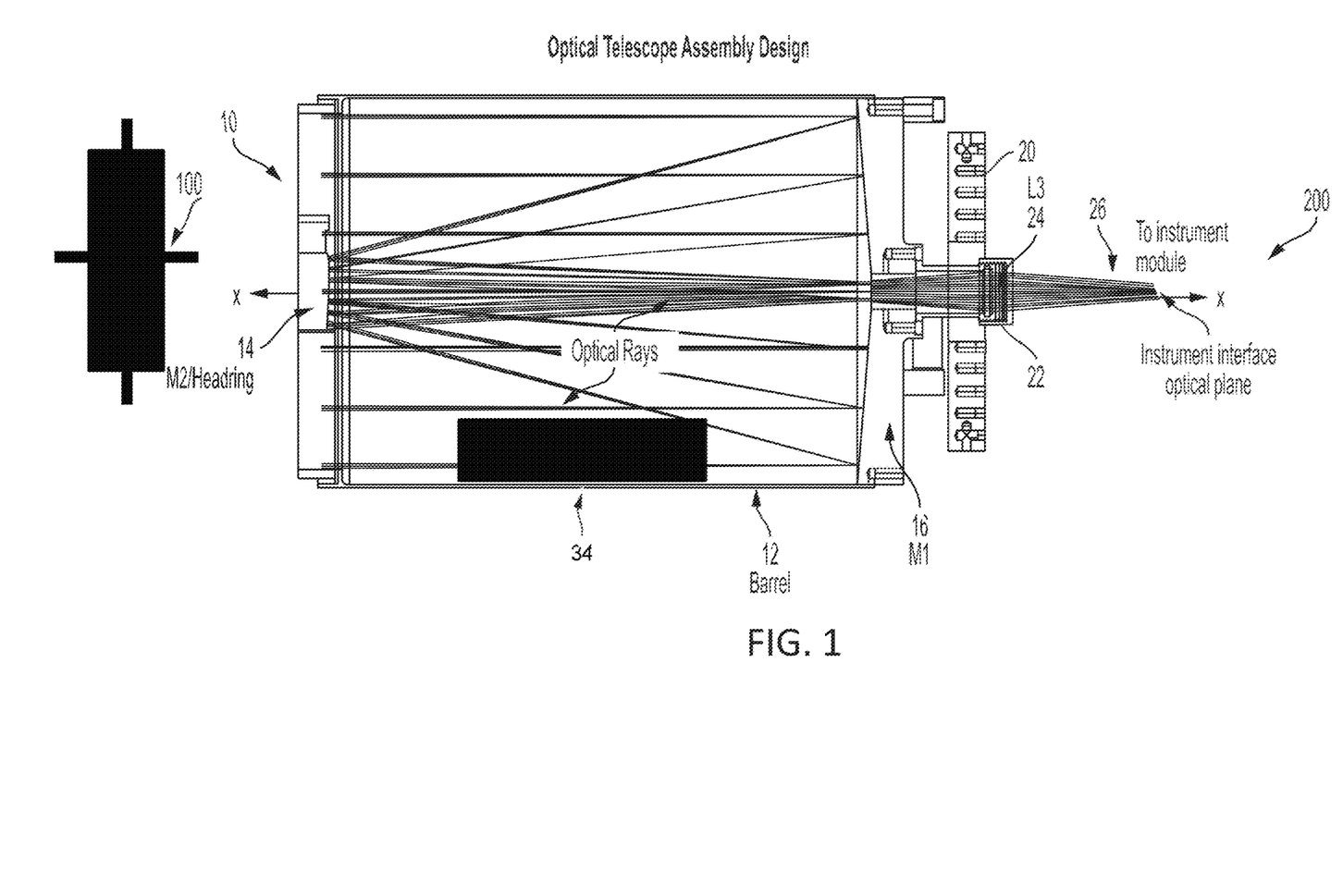
FIG. 1 is a longitudinal cross-section of a versatile space telescope, in accordance with an embodiment.
Figure 2A:
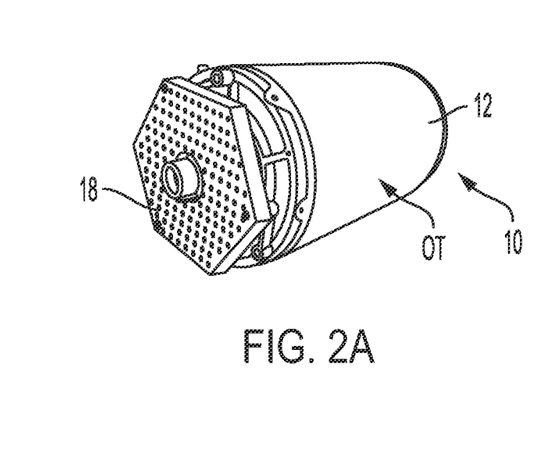
FIG. 2A is a distal perspective view of a space telescope, in accordance with an embodiment.
Figure 2B:
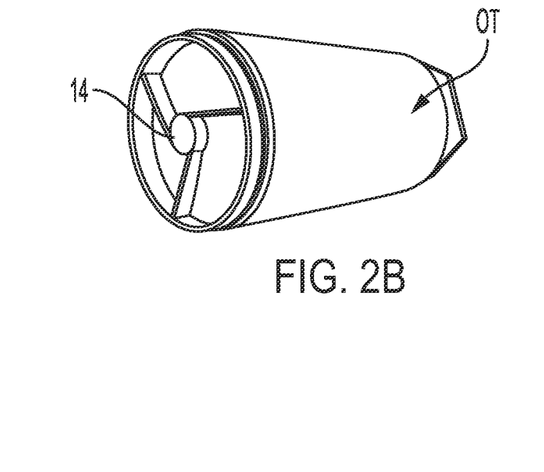
FIG. 2B is a proximal perspective view of a space telescope, in accordance with an embodiment.
Figure 2C:
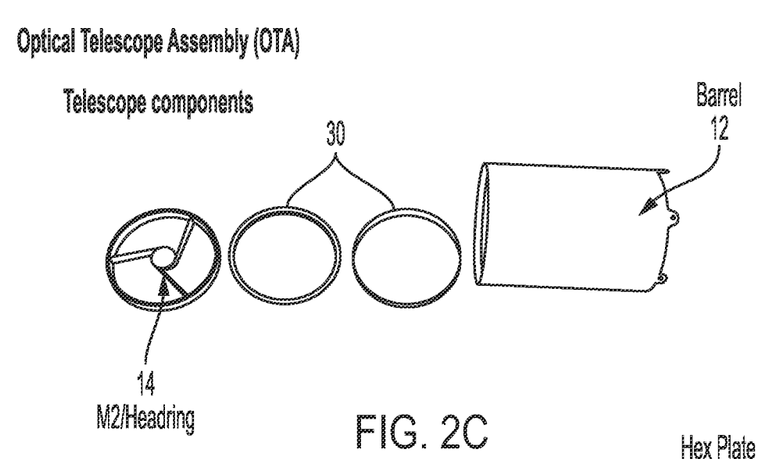
FIG. 2C is an elevation, exploded view of the proximally mounted components of a space telescope, in accordance with an embodiment.
Figure 2D:
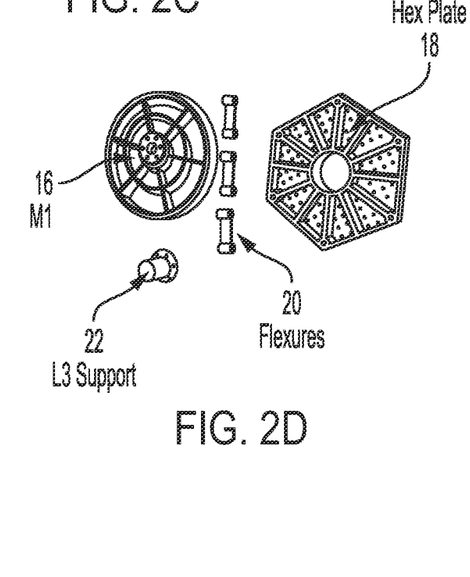
FIG. 2D is an elevation, exploded view of the distally mounted components of a space telescope, in accordance with an embodiment.
Figure 3:
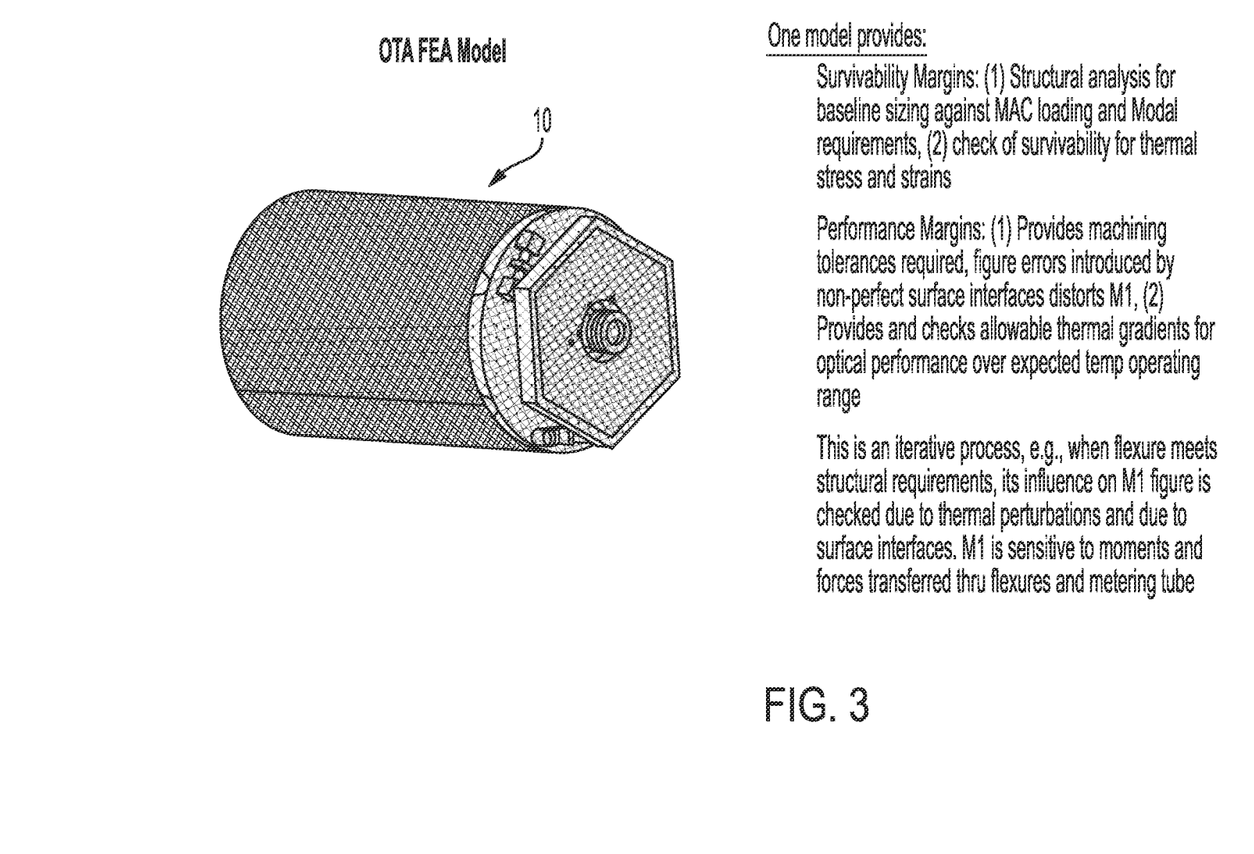
FIG. 3 is a perspective view of an OTA finite element analysis model of a space telescope, in accordance with an embodiment.
Figure 4:
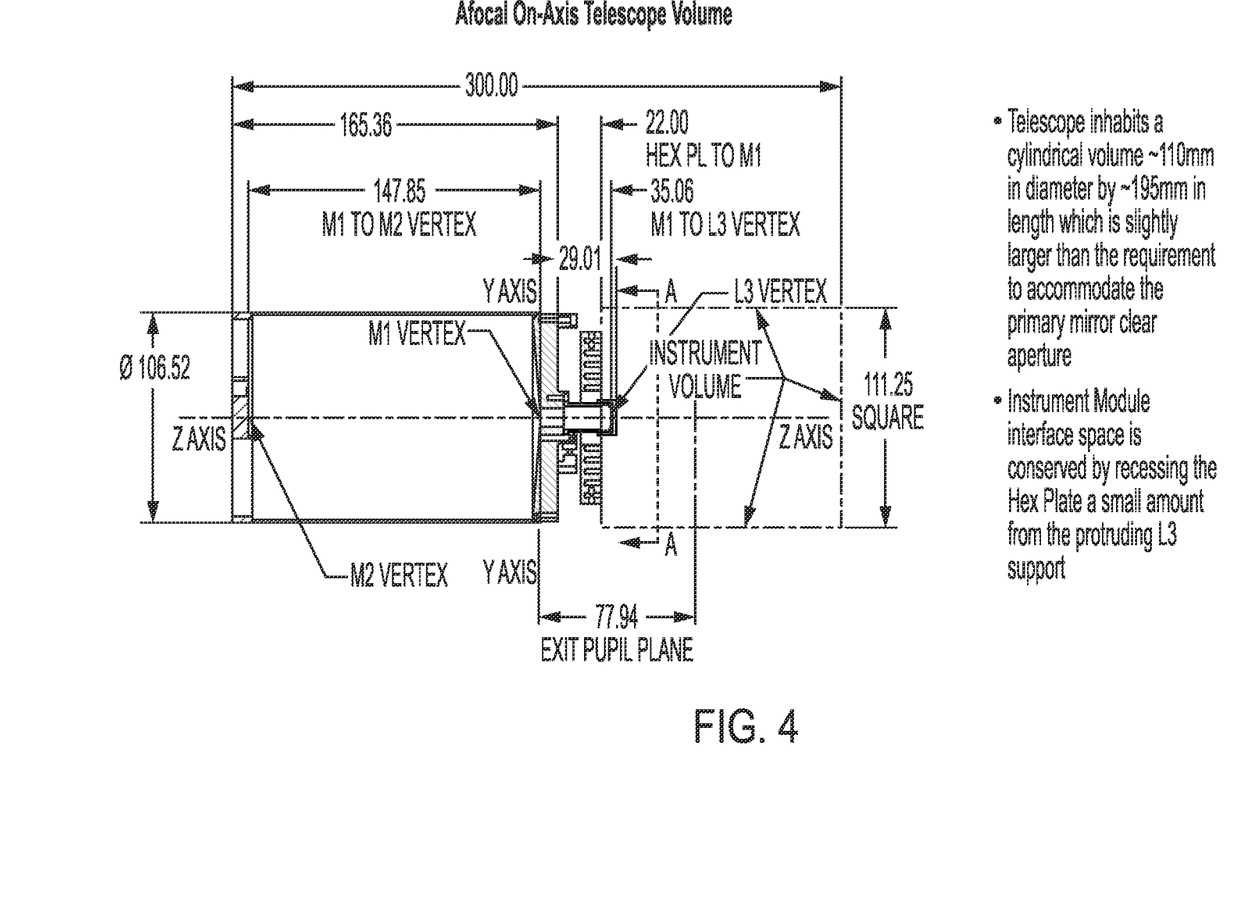
FIG. 4 is a schematic view of an afocal on-axis telescope volume, in accordance with an embodiment.

Referring to FIG. 1, in one embodiment, telescope 10 generally comprises a barrel shaped body 12 that extends along a longitudinal optical axis X-X, a diamond turned first mirror 16 (also shown as M1) entrance pupil attached at the distal end of body 12 and positioned along axis X-X, a diamond turned second mirror and headring assembly 14 (also shown as M2) creating exit pupil attached at the proximal end of body 12 and positioned along axis X-X, a hex plate 18 positioned in longitudinally spaced relation distally from mirror 16 along axis X-X and attached to mirror 16 by flexures 20 (not shown in FIG. 1), a lens support member 22 connected to hex plate 18 and positioned along axis X-X, and a lens 24 mounted to lens support 22. A plurality of optical rays 26 will be received, processed, focused, and transmitted from telescope 10. The proximal end of telescope 10 is adapted for interfacing with a spacecraft 100, such as a CubeSat, while the distal end interfaces with an instrument module 200. A heater 34 can be integrated with the barrel shaped body to provide thermal control.

The prescription for the mirror (M2) 14 is a convex hyperbola. The prescription for the mirror (M1) 16 is a concave ellipse. Lens 24 is a plano-convex aspheric lens.

Referring to FIG. 2, telescope 10 and its component parts can be seen. In FIG. 2C, the mirror (M2) and headring assembly 14 is seen to comprise the mirror/headring 28 and O-rings 30 that seal and tighten the connection to body 12. In FIG. 2D the hex plate 18, mirror (M1) 16, lens support 22 and flexure connectors 20 are shown.

Figure 6:
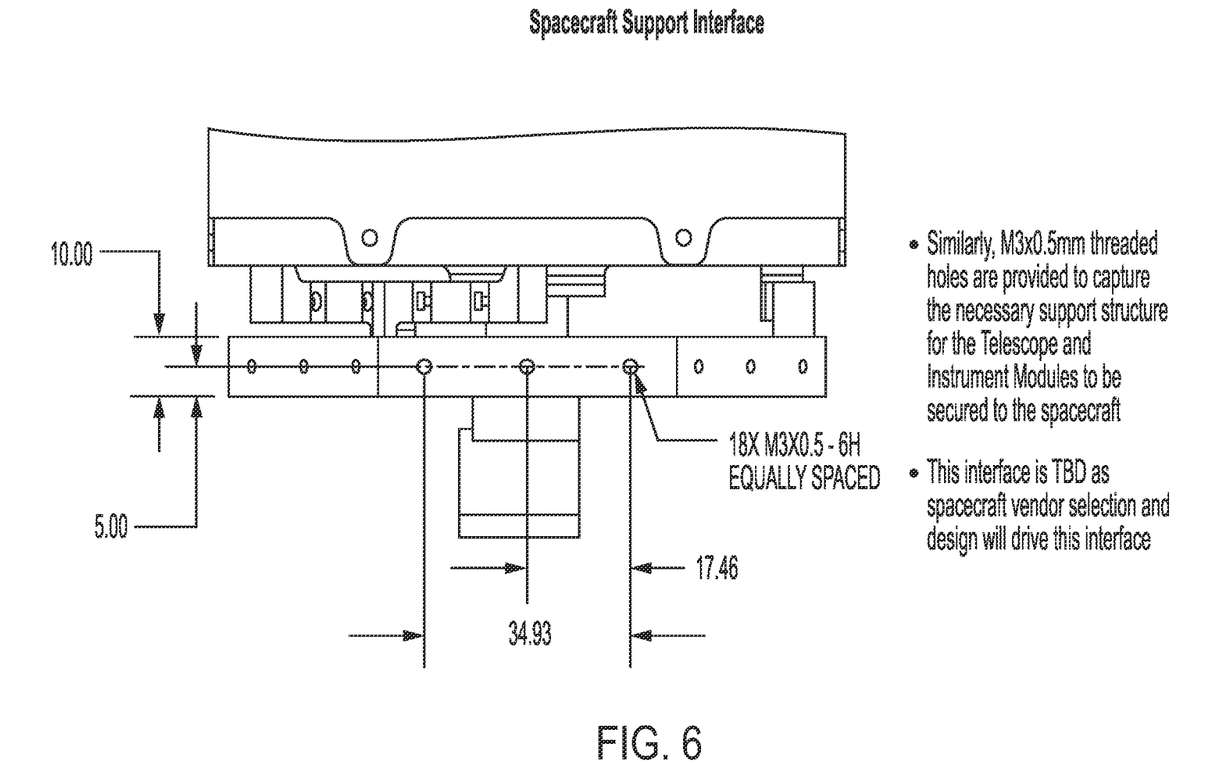
FIG. 6 is a proximal side elevation view of the spacecraft support interface for a space telescope, in accordance with an embodiment.

Referring to FIG. 6, telescope 10 is adapted for connection to spacecraft 100 by an interface at its proximal end. The type of interface can be chosen based on the spacecraft connection requirements.

Figure 5:
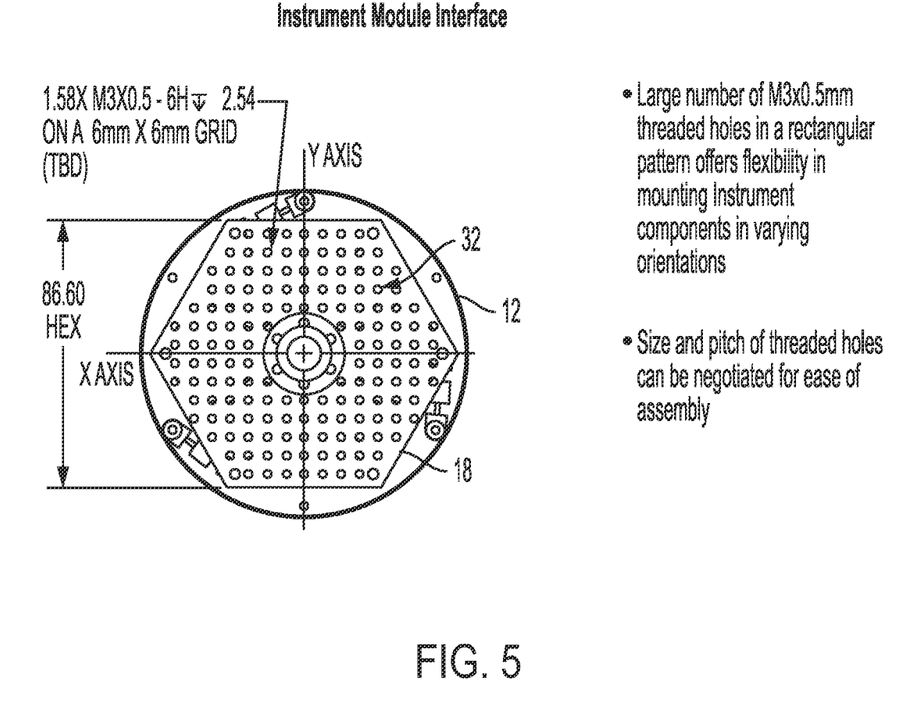
FIG. 5 is a distal end elevation view of the instrument module interface for a space telescope, in accordance with an embodiment.

Referring to FIG. 5. The telescope 10 can attach to the instrument module 200 through hex plate 18. Hex plate 18 is provided with a plurality of tapped holes 32. The holes 32 permit the hex plate 18 to connect to the body 12 as well as the instrument module. By providing a large array of holes 32, a variety of connection orientations can be implemented.

Figures 7A, 7B:
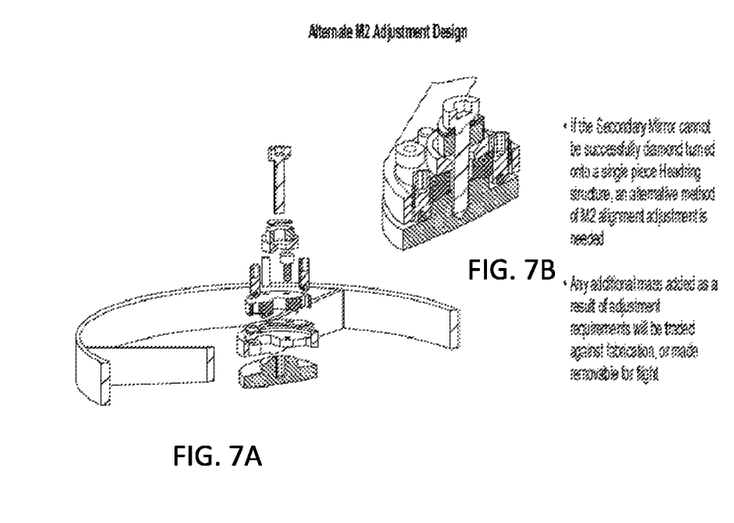
FIGS. 7A and 7B are perspective views of an alternate mirror assembly for a space telescope, in accordance with an embodiment.

Referring to FIGS. 7A-7B, an alternate mirror 12 can be provided if a mirror-headring assembly 14 cannot be implemented.

Figure 8A:
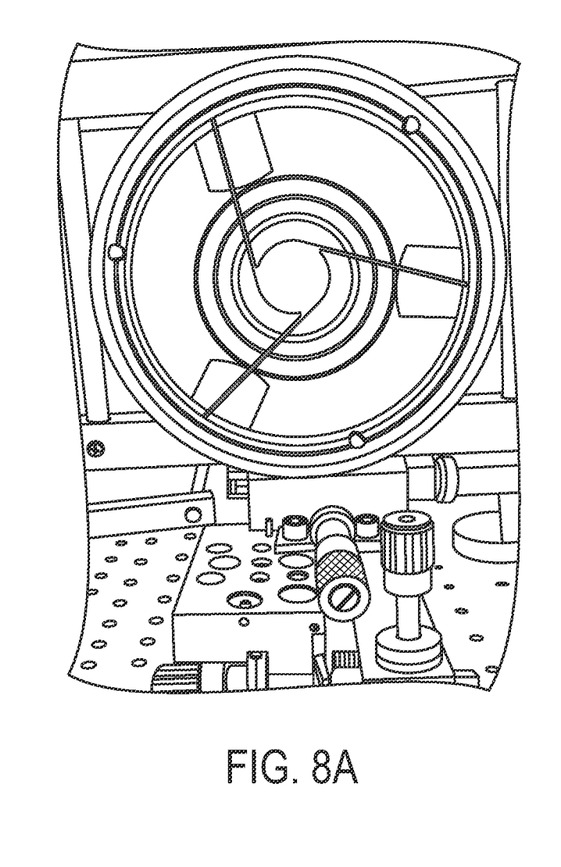
FIGS. 8A, 8B, and 8C are perspective views of an alternate mirror assembly for a space telescope having a lens with an aspheric surface defined by Q-polynomial.
Figure 8B:
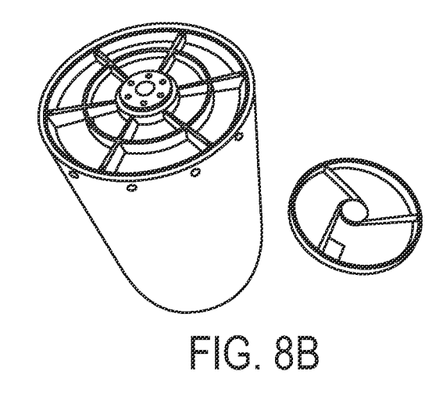
Figure 8C:
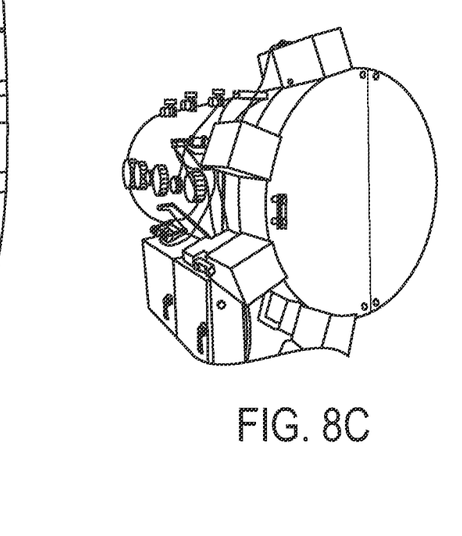

Referring to FIGS. 8A-8C, an alternate mirror assembly for a space telescope having a lens with an aspheric surface defined by Q-polynomial is shown.

In use, as the spacecraft 100 orbits, light/energy will be captured through the entrance pupil of mirror 16. The reflected energy will bounce between mirrors 16 and 14 and exit through the center hole of mirror 16 where it will pass through and be refracted by lens 24. The energy will then be received by the instrument module 200 and transmitted to its ultimate destination. In reverse, the telescope can be used to transmit keys.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A versatile space telescope adapted for interfacing with a spacecraft and an instrument module, comprising:
   a. an aluminum barrel shaped body having a longitudinal optical axis and a proximal end adapted for positioning adjacent the spacecraft via a plurality of threaded holes for capturing a support structure secured to the spacecraft and a distal end adapted for positioning adjacent the instrument module;
   b. a first diamond turned, aspheric aluminum mirror having an entrance pupil and positioned adjacent the distal end of the barrel shaped body and sharing the longitudinal optical axis;
   c. a second diamond turned, aspheric aluminum mirror creating an exit pupil and positioned adjacent the proximal end of the barrel shaped body and sharing the longitudinal optical axis;
   d. at least one heater integrated with the barrel shaped body to provide thermal control;
   e. a hex plate attached to the barrel shaped body, positioned in longitudinally spaced relation from the first mirror and sharing the longitudinal optical axis;
   f. a plano-convex aspheric lens supported by the hex plate and positioned along the longitudinal optical axis; and
   g. a plurality of flexures interconnecting the hex plate to the first mirror.

2. The versatile space telescope according to claim 1, wherein the hex plate comprises a plurality of apertures formed therethrough and that provide a means for interconnecting the instrument module to the telescope.

3. The versatile space telescope according to claim 1, wherein an optical surface of the second mirror is convex hyperbola.

4. The versatile space telescope according to claim 1, wherein an optical surface of the first mirror is concave ellipse.

5. The versatile space telescope according to claim 1, further comprising a lens support member secured to the hex plate and extending along the longitudinal optical axis.

6. The versatile space telescope according to claim 1, wherein the lens comprises an aspheric surface defined by Q-polynomial.

* * * * *